(12) United States Patent
Mykytiuk

(10) Patent No.: US 11,795,087 B2
(45) Date of Patent: Oct. 24, 2023

(54) SYSTEM FOR PURIFYING FRESH, COMBINED AND SALINE WASTEWATER FROM RADIOACTIVE HEAVY METALS

(71) Applicant: Unique Equipment Solutions LLC, Littleton, MA (US)

(72) Inventor: Oleksandr Yuriiovych Mykytiuk, Kyiv (UA)

(73) Assignee: Unique Equipment Solutions LLC, Littleton, MA (US)

( * ) Notice: Subject to any disclaimer, the term of this patent is extended or adjusted under 35 U.S.C. 154(b) by 0 days.

(21) Appl. No.: 17/882,489

(22) Filed: Aug. 5, 2022

(65) Prior Publication Data

US 2023/0036172 A1 Feb. 2, 2023

Related U.S. Application Data

(63) Continuation of application No. 16/954,091, filed as application No. PCT/UA2018/000132 on Dec. 14, 2018, now Pat. No. 11,407,665.

(30) Foreign Application Priority Data

Dec. 19, 2017 (UA) ............................ a 2017 12640

(51) Int. Cl.
| | | |
|---|---|---|
| C02F 9/00 | (2023.01) | |
| C02F 1/28 | (2023.01) | |
| C02F 1/461 | (2023.01) | |
| C02F 1/469 | (2023.01) | |
| C02F 1/68 | (2023.01) | |
| C02F 1/72 | (2023.01) | |
| C02F 101/00 | (2006.01) | |
| C02F 101/20 | (2006.01) | |

(52) U.S. Cl.
CPC ............... *C02F 9/00* (2013.01); *C02F 1/281* (2013.01); *C02F 1/469* (2013.01); *C02F 1/4618* (2013.01); *C02F 1/683* (2013.01); *C02F 1/722* (2013.01); *C02F 2101/006* (2013.01); *C02F 2101/20* (2013.01); *C02F 2305/023* (2013.01)

(58) Field of Classification Search
None
See application file for complete search history.

(56) References Cited

U.S. PATENT DOCUMENTS 4,902,665 A 2/1990 Elfline

FOREIGN PATENT DOCUMENTS

| CN | 101921031 A | 12/2010 |
|---|---|---|
| CN | 204384935 U | 6/2015 |
| CN | 105668716 A | 6/2016 |
| CN | 206069604 U | 4/2017 |
| JP | H10142395 A | 5/1998 |
| JP | 2017144382 A | 8/2017 |
| UA | 2349 | 1/1994 |
| UA | 78704 | 4/2007 |
| UA | A201712640 | 4/2018 |

OTHER PUBLICATIONS

Dolina L.F., "Modern equipment and technologies for wastewater treatment from heavy metal salts: Monograph", Dnepropetrovsk: Continent, 2008, pp. 76-77.

*Primary Examiner* — Chester T Barry
(74) *Attorney, Agent, or Firm* — Loginov & Associates, PLLC; William A. Loginov

(57) ABSTRACT

The invention relates to environment management, particularly to methods for purifying a wastewater in order to eliminate a toxic impact of heavy and radioactive metals. A method for purifying fresh, combined and saline wastewater from radioactive and heavy metals using an electrolysis and a special active substance (sorbent), wherein the wastewater is fed to an electrolyzer with a chamber that is separated by a special membrane that is permeable for ions of metals separately of water, then changes of the pH occur in order to form complex compounds, which comprise ions of radioactive and heavy metals. Afterwards, the adsorption of the obtained 0 compounds by the special active substance (sorbent) and filtering-off on a precoat filter that retains ions of heavy and radioactive metals are performed. The obtained filtrate is cemented without drying and evaporation in order to perform final deposition of the radioactive 0 compounds.

10 Claims, No Drawings

SYSTEM FOR PURIFYING FRESH, COMBINED AND SALINE WASTEWATER FROM RADIOACTIVE HEAVY METALS

RELATED APPLICATIONS

This application is a continuation of U.S. patent application Ser. No. 16/954,091, filed Jun. 15, 2020, now U.S. Pat. No. 11,407,665, entitled A METHOD FOR PURIFYING FRESH, COMBINED AND SALINE WASTEWATER FROM RADIOACTIVE HEAVY METALS, the entire disclosure of which is herein incorporated by reference.

FIELD OF THE INVENTION

The invention relates to environment management, particularly to methods for purifying a wastewater in order to eliminate a toxic impact of heavy and radioactive metals.

BACKGROUND OF THE INVENTION

"A METHOD FOR PURIFYING WATERFROM RADIOACTIVE CONTAMINATIONS" is known, wherein the purification is performed by filtration through a sorbent-aluminum oxide. A mixture of aluminum oxide and 30-50 wt. % of anionite-inertone relative to the total amount of the mixture is used as the sorbent, wherein the sorbent is arranged between two porous titanium partitions, which are located at a distance of 10-15 mm between each other (Ukrainian patent No. 2349 as of Jan. 31, 1994).

A drawback of the known method lies in a low efficacy of water purification from radioactive contaminations, also the method allows to purify fresh water only.

The closest one to the claimed invention is: "A method for purifying liquid radioactive wastes and wastewater". The method for purifying liquid radioactive wastes and wastewater is implemented by means of introducing a sorbent into a solution, the method is characterized in that the natural organogenic sorbent is put into an ion-penetrating shell having a coaxially arranged electrode (cathode) and an external opposite electrode (anode), the shell is put into the solution to be purified, a potential is applied between the electrodes, which acts to cause a directed movement of cations from the solution to be purified to the sorbent followed by their retention in the sorbent matrix (Ukrainian patent No. 78704 as of Apr. 25, 2007).

Drawbacks of the method lie in that the proposed method is used to purify fresh water only.

DETAILED DESCRIPTION

A problem to be solved by the present invention is to develop an effective method for purifying fresh, combined and saline wastewater from radioactive and heavy metals by means of binding ions of radioactive and heavy metals into stable complex compounds. With further filtration of the contaminated water and stable complex compounds on a precoat filter with an active substance (sorbent).

The stated problem is solved as follows.

In the method for purifying fresh, combined and saline wastewater from radioactive and heavy metals using electrolysis and active substance (sorbent), according to the invention, the wastewater is fed to an electrolyzer with a chamber that is separated by a membrane that has low throughput capacity for water, but is permeable for ions of metals. A direct current is supplied to the electrodes of the electrolyzer. The water electrolysis occurs until lowering the water pH in one chamber and increasing the water pH in another chamber. Then, the wastewater from both chambers is mixed and fed to a retention basin until forming complex compounds, which comprise ions of radioactive and heavy metals, are adsorbed by the aluminium-, titanium- and oxygen-based active substance (sorbent) with addition of the hydrogen peroxide, are filtered-off on a precoat filter that retains ions of heavy and radioactive metals in the bound form of complex compounds. The obtained filtrate is cemented without drying and evaporation in order to perform final deposition of the radioactive compounds. Kieselgur and aluminum-, titanium- and oxygen-based active substance (sorbent) are used as a filtration membrane on the precoat filter.

The method is performed as follows.

The contaminated wastewater is fed to the electrolyzer with chambers, which are separated between each other by the membrane that has low throughput water capacity, but is permeable for ions of metals. The direct current with voltage of from 5 to 220 volt and amperage of from 0.1 to 10 ampere per $cm^2$ of interelectrode area is supplied to the electrodes, which are made of titanium or titanium-aluminum alloy. The contaminated wastewater is retained in the electrolyzer until lowering of the water pH<2 in one chamber and increasing the water pH in another chamber for up to >12. The change of pH in the water occurs due to accumulation of OH ions in the course of the water electrolysis. The ratio between the volume of the electrolyzer chambers lies within the range of from 1:1 to 3:1. Then, the contaminated wastewater from both chambers is mixed and fed to the retention basin. The contaminated water is retained in the retention basin for 1 hour, where ions of radioactive and heavy metals are bound into stable complex compounds, which are formed with titanium or aluminum. The complex compounds of radioactive, heavy metals and titanium or aluminum are adsorbed by means of addition of a suspension of the active substance (sorbent) in the amount of 1-50 mg/l and 50% of the hydrogen peroxide in the amount of 0.3-20 mg/l to the water. After addition of the active substance (sorbent) and of the hydrogen peroxide, the water is retained in the retention basin for 12-48 hours under the temperature of from 20° C. to 70° C. Afterwards, the contaminated water with a residue is fed to the precoat filter for filtration. Wherein kieselgur and the active substance (sorbent) are used as a precoat membrane on the filter. Ions of heavy and radioactive metals are retained in the bound form of the complex compounds and are retained by the filter material. The filtrate obtained from the filter is cemented in order to perform final deposition of the radioactive substances.

The claimed method provides for purification of water of ions from heavy and radioactive metals, which are retained in the bound form of the complex compounds that significantly reduces their movability during the period of the long-term final deposition of the radioactive substance. Furthermore, this method allows performing purification of water from radioactive and heavy metals having different salinity (from fresh one to sea one).

What is claimed is:

1. A system for purifying wastewater, containing radioactive heavy metals, using an electrolysis and a sorbent that is based upon at least one of aluminum, titanium and oxygen, comprising:
    (a) an electrolyzer, that receives the wastewater, having a membrane that separates the electrolyzer into a first chamber and a second chamber, in which the membrane is permeable for ions of metals;

(b) a direct current source, that supplies power to the electrolyzer, having electrodes, so that water electrolysis causes lowering of the water pH in a first chamber and increasing of the water pH in a second chamber;

(c) a mixing arrangement that mixes the wastewater from the first chamber and the second chamber;

(d) a retention basin that receives the mixed wastewater from the mixing arrangement so that the mixed wastewater forms complex compounds, which comprise ions of the radioactive heavy metals, that also receives hydrogen peroxide, and wherein the radioactive heavy metals are adsorbed by the sorbent added to the basin; and (e) a precoat filter that filters-off the complex compounds so as to retain the ions of the radioactive heavy metals in a bound form of the complex compounds within the precoat filter.

2. The system for purifying wastewater according to claim 1, characterized in that the precoat filter includes a filtration membrane comprising kieselgur and the sorbent.

3. The system for purifying wastewater according to claim 1, wherein the wastewater comprises at least one of fresh water and saline water.

4. The system according to claim 1, wherein the electrolyzer includes electrodes constructed from titanium or titanium-aluminum alloy.

5. The system according to claim 4, wherein the direct current defines a voltage of 5 to 220 volts and amperage of from 0.1 to 10 amperes.

6. The system according to claim 1, wherein the sorbent is added to the wastewater in an amount of 1-50 mg/l and the hydrogen peroxide is added to the wastewater in an amount of 0.3-20 mg/l.

7. The system according to claim 6, wherein the wastewater is retained in the electrolyzer until the pH thereof is <2 in the first chamber and the wastewater is retained in the second chamber until the pH therein is >12.

8. The system according to claim 1, wherein, after addition of the sorbent and of the hydrogen peroxide, the water is retained in the retention basin for 12-48 hours at a temperature of from 20° C. to 70° C.

9. A wastewater treatment facility employing the system of of claim 1.

10. Treated wastewater produced using the system of claim 1.

* * * * *